(12) United States Patent
Hasegawa et al.

(10) Patent No.: US 9,383,945 B2
(45) Date of Patent: Jul. 5, 2016

(54) METHOD OF WRITING A FILE TO A PLURALITY OF MEDIA AND A STORAGE SYSTEM THEREOF

(71) Applicant: International Business Machines Corporation, Armonk, NY (US)

(72) Inventors: Tohru Hasegawa, Tokyo (JP); Hiroshi Itagaki, Tokyo (JP); Tsuyoshi Miyamura, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 14/094,711

(22) Filed: Dec. 2, 2013

(65) Prior Publication Data

US 2014/0164693 A1    Jun. 12, 2014

(30) Foreign Application Priority Data

Dec. 10, 2012   (JP) .................... 2012-269123

(51) Int. Cl.
| | |
|---|---|
| G06F 3/00 | (2006.01) |
| G06F 5/00 | (2006.01) |
| G06F 12/00 | (2006.01) |
| G06F 3/06 | (2006.01) |
| G11B 27/30 | (2006.01) |

(52) U.S. Cl.
CPC ............ *G06F 3/0686* (2013.01); *G06F 3/0619* (2013.01); *G06F 3/0643* (2013.01); *G11B 27/30* (2013.01)

(58) Field of Classification Search
CPC ... G06F 3/0683; G06F 3/0686; G06F 3/0619; G06F 3/0643

USPC ........ 710/1, 7, 13, 20, 52; 711/111, 114, 115, 711/161; 707/3, 204, 825; 714/6.22, 825
See application file for complete search history.

(56) References Cited

U.S. PATENT DOCUMENTS

| | | | | |
|---|---|---|---|---|
| 6,289,345 | B1 * | 9/2001 | Yasue .................... | G06F 17/50 707/999.01 |
| 7,328,364 | B1 * | 2/2008 | Leong et al. ................. | 714/6.22 |
| 8,024,302 | B2 * | 9/2011 | Debique ........... | G06F 17/30038 707/693 |
| 2006/0059118 | A1 * | 3/2006 | Byrd et al. ....................... | 707/3 |
| 2007/0118576 | A1 * | 5/2007 | Moore et al. .................. | 707/204 |

(Continued)

FOREIGN PATENT DOCUMENTS

JP    11-306190    11/1999

*Primary Examiner* — Farley Abad
*Assistant Examiner* — Henry Yu
(74) *Attorney, Agent, or Firm* — Zilka-Kotab, PC

(57) ABSTRACT

According to one embodiment, a method for writing a file to a plurality of media includes loading a parent medium into a first drive to retrieve ID information about the parent medium from metadata, writing a first file part to the parent medium and, at about a same time, saving a file name, attribute information, and attribute information about the first file part to the parent medium as metadata, loading a child medium into a second drive in order to write subsequent file parts and retrieving ID information about the child medium from metadata, writing the subsequent file parts to the child medium and, at about a same time, saving the ID information and attribute information about the subsequent file parts to the parent medium, and additionally saving the ID information about the child medium and the attribute information about the subsequent file parts as metadata in the child medium.

18 Claims, 6 Drawing Sheets

(56) References Cited

U.S. PATENT DOCUMENTS

| | | | | |
|---|---|---|---|---|
| 2009/0037680 A1* | 2/2009 | Colbert | ................ | G06F 3/0617 711/162 |
| 2011/0238906 A1* | 9/2011 | Amir et al. | ................ | 711/111 |
| 2012/0278799 A1* | 11/2012 | Starks et al. | ................ | 718/1 |
| 2013/0339406 A1* | 12/2013 | Kanfi | ................ | 707/825 |

* cited by examiner

METHOD OF WRITING A FILE TO A PLURALITY OF MEDIA AND A STORAGE SYSTEM THEREOF

RELATED APPLICATIONS

The present application claims priority to Japanese Patent Application Serial No. 2012-269123, filed Dec. 10, 2012, which is herein incorporated by reference.

BACKGROUND

The present invention relates to a method of writing a file to a plurality of media and a storage system thereof and more specifically, the present invention relates to a method of writing a plurality of parts of a file to a plurality of tape media in a storage system which includes at least two tape drives.

The data storage capacity of a storage system which includes a tape drive depends on a maximum capacity of a tape medium used in the tape drive, which serves as an upper limit of the storage capacity. For a fifth generation linear tape open (LTO) tape drive, for example, an amount of data exceeding about 1.5 TB, which is the maximum capacity of the medium, is not capable of being written. Furthermore, when additional data is to be written to a medium which already has some amount of data stored thereto, the amount of the data that is able to be additionally written is less than the maximum capacity of the medium.

A tape drive may be used in a file system, along with a hard disk drive (HDD) and the like. For example, a linear tape file system (LTFS) is an example of one file system for tape drives. When the LTO data is handled as a file in the LTFS, again, the amount of data that may be additionally written is less than the capacity of the tape medium.

Due to recent storage utilization demands, the amount of data desired to be written to a medium has been steadily increasing. In some cases, a total size of a file to be written may be uncertain at the time that the file starts being written. For example, the size of a file to be written is uncertain when the file starts being written during a program recording that is conducted in real time in the broadcasting industry, or where a sequence of video from a universal serial bus (USB) camera in a security system is directly written to a medium. In such cases, the size of the file to be additionally written to the medium may exceed the capacity of the medium without any warning prior to beginning writing the file. If this occurs, the file written up to the moment must be separately saved, and the subsequent data must be written to another medium (known as "spanning"). Currently, there is no method or mechanism capable of achieving spanning in the LTFS.

Japanese Patent Application No. JP11-306190A discloses a technique for rearranging system information so as to write the system information to one medium in order to avoid loading all the media and referring to system information for file management when the system information is distributed among a plurality of media.

However, Japanese Patent Application No. JP11-306190A does not take into consideration a case where a medium is not large enough to hold an entire file to be written and also does not disclose that attribute information of a file is saved in a first medium. Because it takes a very long time to unload and load a tape cartridge (medium), it is essential to reduce the number of times that a tape medium is unloaded and loaded in order to improve the performance of reading a large file.

SUMMARY

According to one embodiment, a method for writing a file to a plurality of media in a storage system that includes at least two drives, the plurality of media being identified as a parent medium and at least one child medium, includes loading the parent medium into a first drive to retrieve identification (ID) information about the parent medium from metadata stored thereon, writing a first file part of a file to the parent medium and, at about a same time, saving a file name, attribute information about the file, and attribute information about the first file part to the parent medium as metadata, keeping the parent medium loaded in the first drive until all subsequent file parts of the file are completely written to the at least one child medium, loading a child medium into a second drive in order to write one or more subsequent file parts of the file and retrieving ID information about the child medium from metadata stored thereon, writing the one or more subsequent file parts to the child medium and, at about a same time, saving the ID information and attribute information about the one or more subsequent file parts stored to the child medium as metadata to the parent medium, and additionally saving the ID information about the child medium and the attribute information about the one or more subsequent file parts stored to the child medium as metadata in the child medium.

In another embodiment, a storage system configured for writing a file to a plurality of media, with the plurality of media being identified as a parent medium and at least one child medium includes at least two drives and a read/write control configured for loading the parent medium into a first drive to retrieve ID information about the parent medium from metadata stored thereon, writing a first file part of a file to the parent medium and, at about a same time, saving a file name, attribute information about the file, and attribute information about the first file part to the parent medium as metadata, keeping the parent medium loaded in the first drive until all subsequent file parts of the file are completely written to the at least one child medium, loading a child medium into a second drive in order to write one or more subsequent file parts of the file and retrieving ID information about the child medium from metadata stored thereon, writing the one or more subsequent file parts to the child medium and, at about a same time, saving the ID information and attribute information about the one or more subsequent file parts stored to the child medium as metadata to the parent medium, and additionally saving the ID information about the child medium and the attribute information about the one or more subsequent file parts stored to the child medium as metadata in the child medium.

Other aspects and embodiments of the present invention will become apparent from the following detailed description, which, when taken in conjunction with the drawings, illustrate by way of example the principles of the invention.

DETAILED DESCRIPTION

Figure 1:
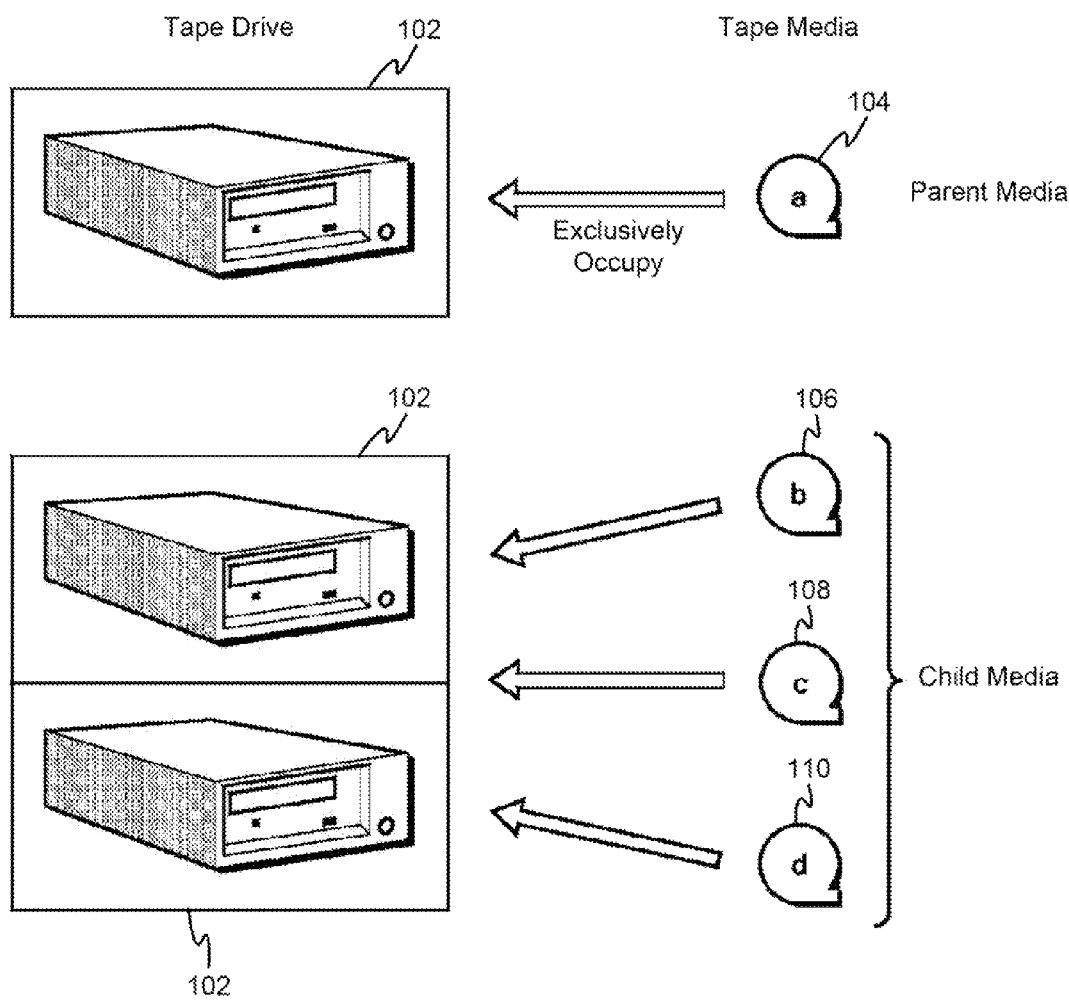
FIG. 1 shows a storage system configured to write a file to a plurality of media, in accordance with one embodiment.

In view of the circumstances described previously, in one embodiment, a method is described for writing a file to a plurality of media that reduces the time required for loading and or unloading that occurs in reading of a plurality of media. Furthermore, a storage system that employs this method is also described according to more embodiments.

According to one general embodiment, a method for writing a file to a plurality of media in a storage system that includes at least two drives, the plurality of media being identified as a parent medium and at least one child medium, includes loading the parent medium into a first drive to retrieve identification (ID) information about the parent medium from metadata stored thereon, writing a first file part of a file to the parent medium and, at about a same time, saving a file name, attribute information about the file, and attribute information about the first file part to the parent medium as metadata, keeping the parent medium loaded in the first drive until all subsequent file parts of the file are completely written to the at least one child medium, loading a child medium into a second drive in, order to write one or more subsequent file parts of the file and retrieving ID information about the child, medium from metadata stored thereon, writing the one or more subsequent file parts to the child medium and, at about a same time, saving the ID information and attribute information about the one or more subsequent file parts stored to the child, medium as metadata to the parent medium, and additionally saving the ID information about the child medium and the attribute information about the one or more subsequent file parts stored to the child medium as metadata in the child medium.

In another general embodiment, a storage system configured for writing a file to a plurality of media, with the plurality of media being identified as a parent medium and at least one child medium, includes at least two drives and a read/write control configured for loading the parent medium into a first drive to retrieve ID information about the parent medium from metadata stored thereon, writing a first file part of a file to the parent medium and, at about a same time, saving a file name, attribute information about the file, and attribute information about the first file part to the parent medium as metadata, keeping the parent medium loaded in the first drive until all subsequent file parts of the file are completely written to the at least one child medium, loading a child medium into a second drive in order to write one or more subsequent file parts of the file and retrieving ID information about the child medium from metadata stored thereon, writing the one or more subsequent file parts to the child medium and, at about a same time, saving the ID information and attribute information about the one or more subsequent file parts stored to the child medium as metadata to the parent medium, and additionally saving the ID information about the child medium and the attribute information about the one or more subsequent file parts stored to the child medium as metadata in the child medium.

In various embodiments, a method is described for writing a file to a plurality of media in a storage system (e.g., a tape library system) that uses at least two tape drives, the plurality of media being identified as a first medium (e.g., a parent medium) and at least one subsequent medium (e.g., one or more child media). The writing method, in one embodiment, comprises:

(1) a step of loading (mounting) the parent medium into one tape drive to retrieve metadata comprising identification (ID) information, the metadata being stored to the parent medium;

(2) a step of writing a first file part of a file to the loaded parent medium and simultaneously saving:
  (a) a file name and attribute information about the file as metadata, and
  (b) attribute information about the first file part written in the parent medium as metadata;

(3) a step of causing the loaded parent medium to remain in the tape drive until subsequent file parts are completely written to the one or more child media successively loaded to one or more other tape drives;

(4) a step of loading each of the one or more child media into another tape drive and retrieving metadata comprising ID information from the child medium in order to write each subsequent file part;

(5) a step of writing each of the subsequent file parts to each of the one or more child media and simultaneously saving:
  (c) the ID information on the parent medium, and
  (d) attribute information on the file part written in the child medium as metadata;

(6) a step of additionally saving:
  (e) the ID information on the child medium, and
  (f) the attribute information on the file part as the metadata in the residing parent medium; and (7) a step of repeating the steps (4) to (6) until a last file part is completely written to a subsequent child medium.

The writing method described above is characterized in that the parent medium and the child medium may be divided into two or more partitions in order to allow reading and writing by a file system (e.g., LTFS) for sequential access to the storage system (e.g., a tape library system), in one embodiment. The partitions may include an index partition in which the metadata of the files are saved, and a data partition in which data of the files are saved, the metadata in the parent medium may be saved in the index partition of the parent medium, the metadata in the child medium may be saved in the index partition of the child medium, the attribute information on the first file part included in the metadata in the parent medium may include: a first file part name, a data position in the medium (e.g., a block identification number, an offset, etc.) and a size of the data, and the attribute information on the subsequent file part included in the metadata in the child medium may include a file part name, a data position in the medium (a block identification number and an offset, for example) and a size, according to various embodiments.

The writing method described, above is characterized in that in step (6), the ID information on the child medium is associated with the attribute information on the file part written to the child medium and additionally saved as the metadata in the parent medium, in one embodiment.

The writing method described above is characterized in that in steps (6) and (7), the ID information, on each child medium is saved as metadata in the parent medium in such a manner that the order in which the subsequent file parts are written to the child media is identified, in one embodiment. Furthermore, a plurality of media to which a file is written in the writing method described above may be provided in one embodiment.

In another embodiment, a method of reading a file written to a plurality of media according to the writing method described above is described. The reading method comprises:

(1) a step of loading one of the plurality of media in which parts of a file are saved into a tape drive;

(2) a step of reading metadata from the loaded medium and determining from the metadata whether the medium is a parent medium or a child medium for the file;

(3) a step of retrieving ID information on the parent medium from the metadata saved in the child medium when the loaded medium is a child medium;

(4) a step of loading the parent medium identified by the retrieved ID information into a drive;

(5) a step of reading a written first file part based on metadata saved in the loaded parent medium and simultaneously retrieving ID information on each of the child media in which each file part is saved from the metadata;

(6) a step of loading each of the child media associated with the retrieved ID information into a tape drive based on the ID information and reading each file part saved to each of the child media based on attribute information on the file part;

(7) a step of repeating step (6) by loading each of the child media associated with the ID information retrieved, in step (5), and reading subsequent file parts from each of the child media; and (8) a step of ending the reading of the file when an end of the file is detected in step (7).

The reading method described above according to one embodiment is characterized in that when it is determined in step (2) that the loaded medium is a parent medium, step (5) follows step (2) instead of steps (3)-(4).

Furthermore, a storage system (e.g., a tape library system) is provided in one embodiment that uses at least two tape drives, the storage system writing a file to a plurality of media, and the plurality of media being identified as a first medium (e.g., a parent medium) and at least one subsequent medium (e.g., one or more child media). In one embodiment, a read/write control in the storage system may perform the following steps:

(1) a step of loading (e.g., mounting) the parent medium into one tape drive to retrieve ID information on the parent medium from metadata stored thereto;

(2) a step of writing a first file part of a file to the loaded parent medium and simultaneously saving:
(a) to file name and attribute information on the file, and
(b) attribute information on the first file part in the loaded parent medium;

(3) causing the loaded parent medium to remain in the tape drive until subsequent file parts are completely written to the one or more child media successively loaded to one or more other tape drives;

(4) a step of loading, the child medium into another tape drive and retrieving ID information from the child medium from metadata in order to write each subsequent file part;

(5) a step of writing each of the subsequent file parts to each of the one or more child media and simultaneously saving:
(c) the ID information on the parent medium, and
(d) attribute information on the file part written in the child medium as metadata;

(6) a step of additionally saving
(e) the ID information on the child medium, and
(f) the attribute information on the file part as the metadata in the residing parent medium; and (7) a step of repeating the steps (4) to (6) until a last file pal is completely written to a subsequent child medium.

Furthermore, in one embodiment, a storage system is provided that reads a file written to a plurality of media according to the writing method described above. A read/write control in the reading storage system may be configured to perform:

(1) a step of loading, one of the plurality of media in which parts of the file are saved into a tape drive;

(2) a step of reading metadata from the loaded medium and determining from the metadata whether the medium is a parent medium or a child medium for the file;

(3) a step of retrieving ID information on the parent medium from the metadata saved in the child medium when the loaded medium is a child medium;

(4) a step of loading the parent medium identified by the retrieved ID information into a tape drive;

(5) a step of reading a written first file part based on metadata saved in the loaded parent medium and simultaneously retrieving ID information on the child media in which each file part is saved from attribute information of the file part included in the metadata;

(6) a step of loading the child medium associated with the retrieved ID information into a tape drive based on the ID information and reading the file part in the child medium based on attribute information of the file part;

(7) a step of repeating step (6) by loading the child media associated with the ID information retrieved in step (5), and reading the subsequent file parts from the child media; and (8) a step of ending the reading of the file when an end of the file is detected in step (7).

A storage system in which this methodology is applied reduces the time required for unloading and loading that occurs in reading a file written to a plurality of media in conventional systems, and improves reading performance.

In the following, embodiments (practical examples) are described with regard to cases where data of a file part of a file is written to, read from, and/or edited in a storage system (including a plurality of tape drives).

These descriptions assume that a plurality of drives are used to write an amount of data to a plurality of media that exceeds the capacity of a single medium. A writing method comprises the following steps, in one embodiment:

(1) Once loaded into a tape drive, a first medium (a parent medium) is kept residing in the tape drive until a file is completely written.

(2) Writing to the remaining medium or media (child medium or media) is conducted using another tape drive or two or more other tape drives.

(3) Information on the media containing the fragments (file parts) of a divided file is centrally managed in the first medium.

(4) ID information on the parent medium is saved in the child media.

FIG. 1 shows a storage system that writes a file to a plurality of media according to one embodiment. Tape mediums 104, 106, 108, and 110 are each denoted by ID information, a, b, c, and d, which are indicators of their respective tape medium, and the storage system identifies a desired medium by its ID. In some embodiments, the storage system includes two or more tape drives 102. A first medium (a parent medium) 104 identified by ID information a is loaded into a tape drive 102, and a head of the file (a first file part) is written to the tape medium 104. The parent medium 104 exclusively occupies the tape drive 102 until the entire file is completely written, in this embodiment.

Attribute information (e.g., file name and file size) of the file is saved in the parent medium 104 as metadata. Every attribute information (file part name, data position on the medium, file size, etc.) of the fragments (file parts 1, 2, 3, and 4) associated with the ID information (b, c, d) on the child media 106, 108, 110 is saved as metadata in the parent medium 104 while the parent medium 104 is loaded in the tape drive 102. The term "offset" indicates a value (e.g., a byte value) of a difference between a block assigned with a block identification number and the head of the file. The block identification number allows both the host and the tape drive 102 to identify the block to be read or written. Although it is assumed that a tape library system is used, the embodiments described herein may be applied to any system incorporating two or more tape drive units.

Figure 2A:
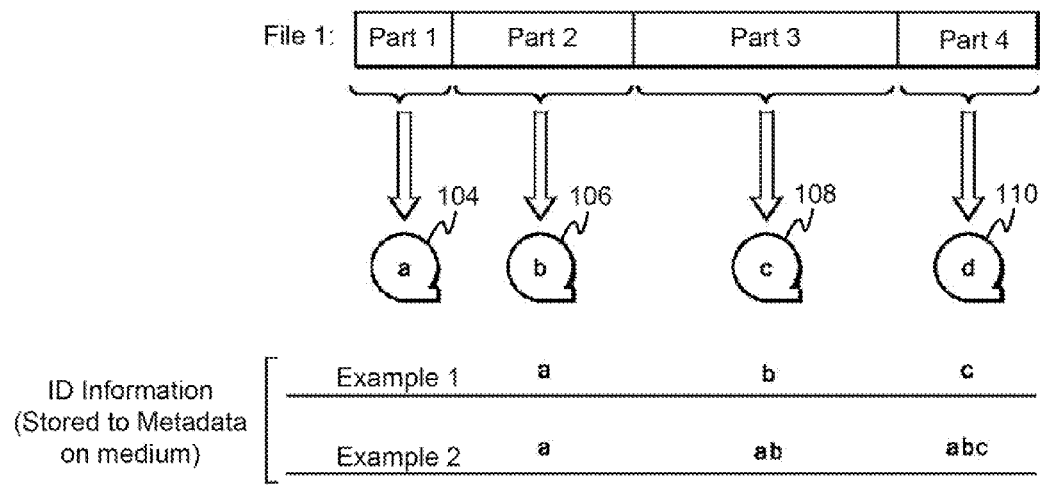
FIG. 2A shows how a plurality of media may hold identification (ID) information about other media in spanning of a file across the plurality of media, according to the prior art.
Figure 2B:
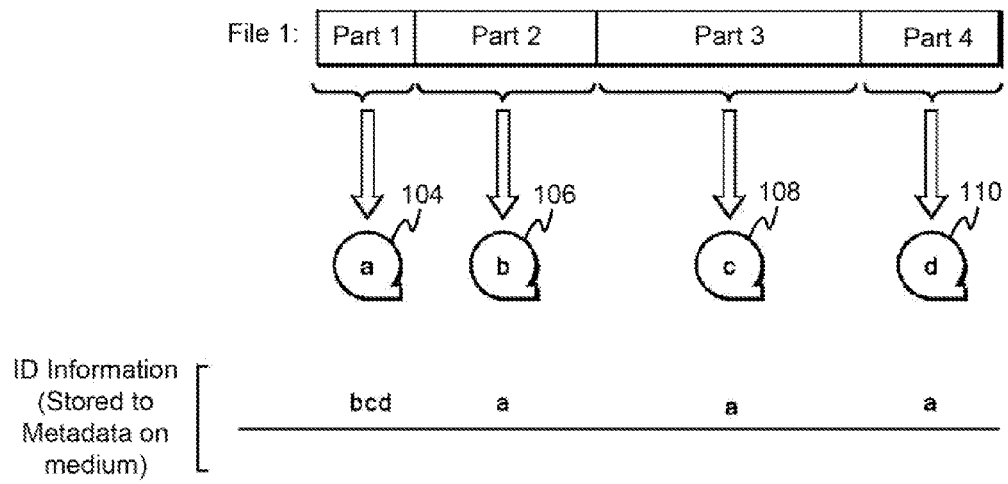
FIG. 2B shows how a plurality of media may hold identification (ID) information about other media in spanning of a file across the plurality of media, in accordance with one embodiment.

FIGS. 2A-2B show ways in which each of a plurality of media 104, 106, 108, and 110 may hold the ID information, a, b, c, and d on the other media in spanning of a file across the plurality of media. FIGS. 2A-2B show cases where one file is divided into four file parts, which are written to four media, for example.

FIG. 2A shows a conventional spanning method in which one file is written to a plurality of media. For example, information about the medium to which the file is written immediately before the current medium is written to the current medium (Example 1), or information about all the media to which the file is written before the current medium is written to the current medium (Example 2).

In Example 1, the linkage of the media should be traced one by one in order to read the file on the media. In Example 1, unnecessary cartridge (medium) unloading and loading occur.

In Example 2 file 1 may be read from any medium by identifying the medium that includes the head of the file in one unloading and loading. However, if file 1 is modified, the information on the medium in which the modification occurs has to be reflected in the plurality of media, so that media unloading and loading occur a plurality of times.

FIG. 2B shows a spanning method according to one embodiment in which a file is written to a plurality of media. In writing, of the file, attribute information on the file part to be spanned is written to the parent medium. ID information that identifies the parent medium is written to the child media. ID information b, c, and d on the child media 106, 1.08, 110 to which the file parts (parts 2, 3 and 4) are to be written are saved in the parent media 104 identified by ID information a. The first file part (part 1) is written to a data partition in the parent medium 104. The parent medium 104 is kept loaded in the drive 102 until the subsequent file parts 2, 3 and 4 are completely written to the child media 106, 108, 110 identified by ID information b, c, and d. The ID information b, c, and d on the child media 106, 108, 110 to which the subsequent file parts 2, 3 and 4 are written is also saved in the parent medium 104 as metadata. The order of writing of the file parts may be identified by the order of arrangement of the ID information b, c, and d saved in the parent medium 104. In addition, attribute information on the file parts associated with the ID information b, c, and d on the child media 106, 108, 110 is also saved in the parent medium 104 as a metadata in one embodiment. The file parts (parts 2, 3 and 4) are written to data partitions in the respective child media 106, 108, 110. The attribute information on the file parts are saved as metadata in this embodiment. The file parts written to the child media 106, 108, 110 are sequentially read following file part 1 written to the parent medium 104.

A file system (LTFS, for example) may read the file part in each single child medium 106, 108, or 110 by specifying the part name thereof. Not only the file parts and the attribute information thereof, but also the ID information a on the parent medium 104 may be saved in the child media 106, 108, 110, such as in metadata. In one embodiment, a library manager may acquire the ID information on the parent medium 104 from the metadata saved in the child media 106, 108, 110 and loads the parent medium 104 into the drive based on the ID information. The library manager acquires the ID information on the child media 106, 108, 110 to which the file parts are sequentially written from the metadata in the parent medium 104 and reads the file parts in the order of the ID information to complete the reading of the entire file.

Figure 3:
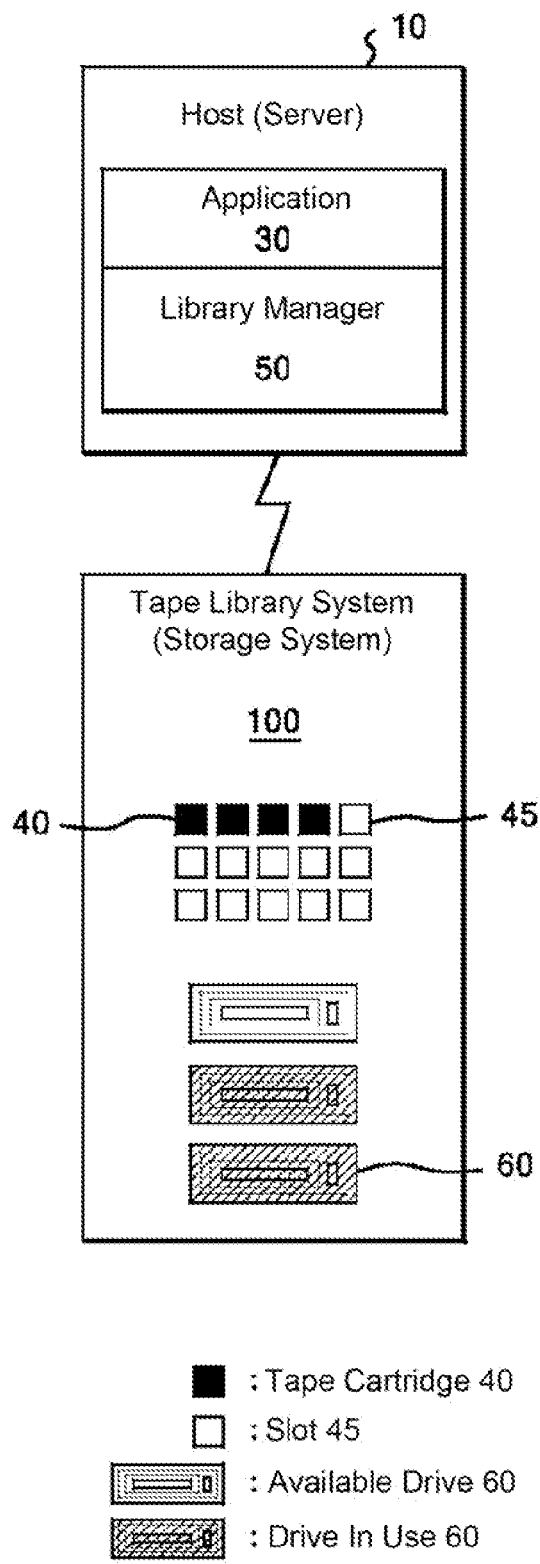
FIG. 3 shows an example of a configuration for a tape library system including a plurality of tape drives in one embodiment.

FIG. 3 shows an example of a configuration of a tape library system including a plurality of tape drives according to one embodiment. A storage system 100 includes three tape drives 60, tape cartridges (media) 40 and slots 45 that house the tape cartridges. In the storage system, there are a large number of tape cartridges 40 housed in the slots 45.

A library manager 50 is disposed between a host 10 and the storage system 100 and centrally manages the plurality of drives 60 and the plurality of tape cartridges 40. The library manager virtualizes the plurality of cartridges 40 and the drives 60 to conduct read/write control. An example of the library manager 50 is the tape system library manager (TSLM) available from IBM Corporation. An application 30 in the host 10 makes file read/write requests to the storage system 100 via the library manager 50. The storage system 100 is controlled by various commands, such as read commands, write commands and positioning commands, issued by the application 30. The library manager 50 temporarily stores these commands from the application and outputs small computer system interface (SCSI) commands, or the like, corresponding to the commands to the storage system 100. An example of the application as dedicated software is Tivoli Storage Manager available from IBM Corporation.

The library manager 50 receives a command for a load request as a command from the application. To execute the command, the library manager 50 typically searches the plurality of (three) drives for an available drive. The tape cartridge that is the target of the load request is mounted in the available drive to which the tape cartridge may be loaded. If the three drives are all in use, the library manager waits for a drive to be available.

Next, the tape drive (drive) 60 is described. The tape drive 60 writes and reads a plurality of pieces of data transmitted from/to the host 10 to/from a tape recording medium in units of data sets (abbreviated as DS) having a fixed length. A typical size of DS is 4 MB. The application 30 in the host 10 transmits a write/read request to the tape drive via a file system in units of 128 KB blocks. In the case where SCSI is used as a communication standard, the host 30 issues a request (Write/Read) for write/read data to the tape drive 60. The tape drive reads and writes data in units of data sets (DS) comprising a plurality of blocks.

Under the command received from the host 10, the tape drive 60 writes or reads data to or from a tape. The tape drive 60 includes a buffer, a read/write channel, a head, a motor, a reel around which the tape (medium) is wound, a read/write control, a head position controlling system and a motor driver. The tape cartridge is removably mounted on the tape drive. The tape runs in the longitudinal direction as the reel rotates. The head is used to write data to the tape and read data from the tape as the tape runs in the longitudinal direction. The tape cartridge 40 is provided with a non-contact non-volatile memory referred to as a cartridge memory (CM). The tape drive 10 conducts writing to and reading from the CM provided in the tape cartridge 40 in a non-contact manner. The CM stores a cartridge attribute. The tape drive may optimally conduct reading and writing by retrieving the cartridge attribute from the CM.

The tape drive may be used in the file system, as with a HDD or the like. For example, in the LTFS, data written to a medium may be made to appear as a file. The tape drive divides a tape into two partitions. The tape drive may handle each partition like one tape and selectively write data to each partition. In a file system for the tape drive, such as the LTFS, data written to a medium may be made to appear as a file. In the LTFS, as attribute information on a file, the position on the medium, the size, the file path or the like is held in an index partition. If a file is modified and divided into a plurality of parts, the file is expressed by a plurality of components as metadata. For example, if a file file_name is divided into three parts, the metadata are described as file_name, length, and ((offset1, size1), (offset2, size2), (offset3, size3)). These pieces of metadata allow one file, file_name, which is distributed among three media, to be managed as one file in the LTFS.

Figure 4A:
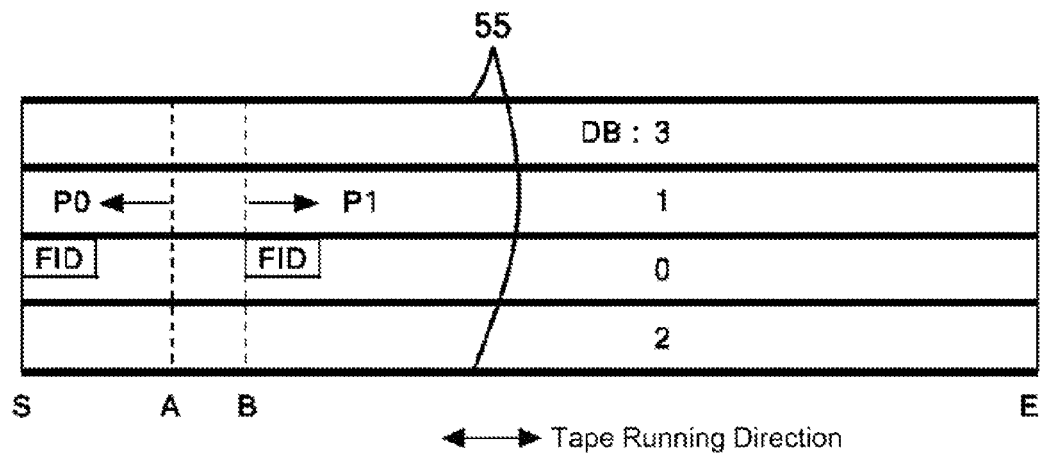
FIGS. 4A-4B show a tape medium which includes an index partition and a data partition, according to several embodiments.
Figure 4B:
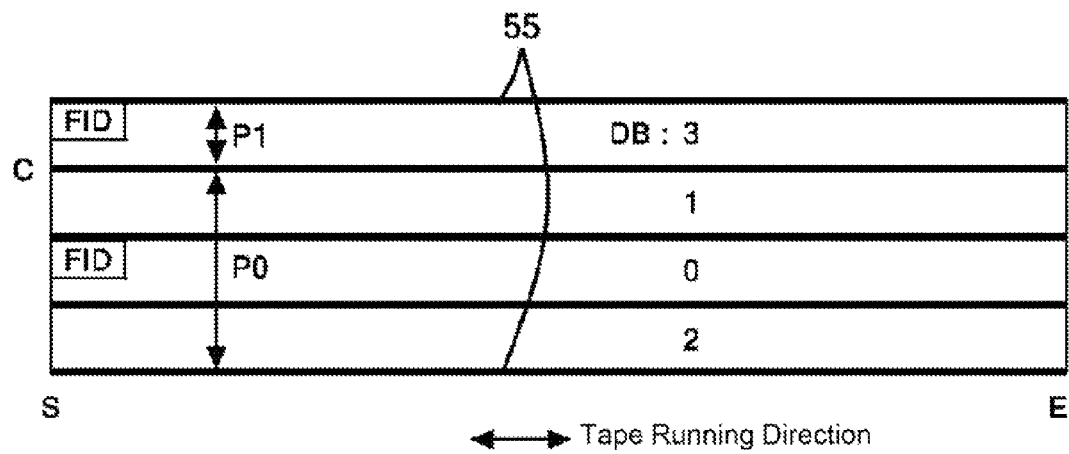

FIGS. 4A-4B show cases where a tape medium includes two partitions (the index partition and a data partition). FIGS. 4A-4B are diagrams showing examples of a configuration of a tape medium in the tape cartridge 40 according to one embodiment.

FIG. 4A shows an example of the tape medium supported by the Enterprise Tape Drive TS1140 available from IBM Corporation. FIG. 4B shows an example of a tape medium in conformity with the LTO5.

In the example shown in FIG. 4B, the tape is divided at positions A and B in the tape running (longitudinal) direction into partitions P0 and P1. The positions A and B may be arbitrarily set or set according to some convention.

In the example shown in FIG. 4B, the tape is divided at a position C in the tape width (lateral) direction into partitions P0 and P1. In both the figures, the number of partitions is two, and the tape is divided into two partitions P0 and P1. However, of course, depending on the specification, the tape may be divided into any number of, such as three or more, partitions.

In both FIGS. 4A-4B, five servo bands 55 are provided on a recording face so as to form four data bands DB0 to DB3 having a width of 12.65 mm on the tape. For example, in the LTO5, one data band has 320 data tracks (not shown), so that the tape has 1280 data tracks in total. A servo pattern for precise guiding (tracking) of the head is previously recorded in each of the servo bands 55. The tape drive 10 conducts data writing and reading by precisely positioning the head by reading the servo patterns in the two servo bands 55 on the opposite sides of each data band DB0 to DB3.

In regions denoted as FID shown in FIGS. 4A-4B, the same information as the information written to the CM in the tape cartridge, such as information on how the data has been written to the tape medium, is recorded. Therefore, even if it is difficult to read the data from the CM, the data may be retrieved from the tape cartridge.

More specifically, the partition P0 in FIG. 4A is designated as the index partition, and the partition P1 is designated as the data partition, for example. The histories of the file and the index information are stored in the index partition. Since only metadata including the attribute information on the latest file part is always stored in the index partition P0 located at the head of the tape medium, the file may be quickly accessed in the file system (e.g., LTFS).

A writing method according to one embodiment is as follows.

(1) An arbitrary first medium is loaded into a drive and data writing is started. The first medium becomes the parent medium. For example, the LTFS writes data in units of blocks having a fixed length (128 KB for IO of LINUX, for example). Once a block is successfully written, the next block is fed. The file size is uncertain at the start of the writing. Since it is uncertain whether the writing occurs across a plurality of media, a normal file writing is started.

(2) When the size of the file written exceeds the capacity of the parent medium, another medium (a child medium) is loaded into a different drive. The parent medium to which the first file part is written is kept loaded (residing) in the drive. The file is divided into a plurality of parts (e.g., parts 1, 2, 3 and 4), which are sequentially written to the parent medium and the subsequent child media. The attribute information on the file (including the file name and the file size), the first part 1 of the file and the attribute information on the first part 1 (including the first part name, e.g., "part 1," the data position in the medium, and the size) are saved in the parent medium. In addition, the parent medium also includes the attribute information on the file parts (the file part names (e.g., "part 2," "part 3," and "part 4"), the ID information (e.g., b, c, and d) on the child media, the data positions in the respective media and the sizes). These pieces of attribute information are saved as metadata. The order of the pieces of ID information in the metadata indicates the order in which the file parts are written to the child media. The data position in the medium is indicated by the block identification number and the offset.

(3) When the size of the file written exceeds the capacity of the medium, another medium (a child medium) is loaded into a different drive. In this example, if all the drives are occupied with the respective media, a medium other than the first medium to which the allocated file part is completely written is unloaded to provide an available drive. A child medium is then loaded into the available drive to write the subsequent file part. Metadata saved in the child medium includes the ID of the parent medium, the attribute information on the file part, such as the file part name, e.g., "part 2," "part 3," "part 4"), and the data position in the medium, and the size.

In other words, the writing method comprises loading the parent medium into a first drive to retrieve ID information about the parent medium from metadata stored thereon, writing a first file part of a file to the parent medium and, at about a same time, saving a file name, attribute information about the file, and attribute information about the first file part to the parent medium as metadata, keeping the parent medium loaded in the first drive until all subsequent file parts of the file are completely written to the at least one child medium, loading a child medium into a second drive in order to write one or more subsequent file parts of the file and retrieving ID information about the child medium from metadata stored thereon, writing the one or more subsequent file parts to the child medium and, at about a same time, saving the ID information and attribute information about the one or more subsequent file parts stored to the child medium as metadata to the parent medium, and additionally saving the ID information about the child medium and the attribute information about the one or more subsequent file parts stored to the child medium as metadata in the child medium.

Furthermore, the writing method may include loading an additional child medium into a drive other than the first drive in order to write one or more remaining subsequent file parts that have not yet been written and retrieving ID information about the additional child medium from metadata stored thereon, writing the one or more remaining subsequent file parts to the additional child medium and, at about a same time, saving the ID information and attribute information about the one or more remaining subsequent file parts in the additional child medium as metadata on the parent medium, and additionally saving the ID information about the additional child medium and the attribute information about the one or more remaining subsequent file parts as the metadata in the additional child medium. Additional child media may be loaded and subsequent file parts may be written to the additional child media until a last file part of the file is written to the additional child media.

A reading method according to one embodiment is as follows.

(1) When a file read request is received, the first file part of the file is transferred to the host in unit of block having a fixed length. The parent medium is identified by the ID information. The application in the host loads the medium identified by the ID information into a drive via a file system (e.g., LTFS) and starts reading the first file part in unit of block.

In reading the file, if the parent medium including the first file part (e.g., part 1) has already been loaded into a drive, the file is sequentially read from the head.

When the child media including the file parts following the first part of the file have already been loaded into drives, the file system may read the ID information on the parent medium from the metadata in the child media and identify the parent medium by the ID. The parent medium is then loaded into an available drive, and the file part in the parent medium begins to be read. When reading the second and later media (the child media), the first medium (the parent medium) is kept residing in the drive, and another drive is used to read the second and later media. The metadata in the parent medium includes the ID information on the plurality of child media so that the order in which the subsequent file parts are written is known.

(2) If all the drives are occupied with the respective media, any medium other than the parent medium from which the file part is completely read is unloaded to provide an available drive. The next child medium is loaded into the available drive to read the subsequent file part. If the end of the file part in the parent medium or the child medium is reached, the medium in which the next file part is written is loaded into a drive and the file part starts being read. The parent medium does not always have to reside in the drive in one embodiment. The parent medium may be unloaded if the first file part has already been completely read and the metadata is saved in a DRAM memory, or the like. The reading performance is improved by loading the child media into the drives as quickly as possible. Not only the entire file but also the file part written to a particular child medium may be retrieved separately as a single file.

In other words, a reading method may comprise loading one of the plurality of media in which a part of the file are saved into a drive, reading metadata from the loaded medium and determining from the metadata whether the medium is a parent medium or a child medium for the file, retrieving ID information on the parent medium from the metadata saved in the child medium when the loaded medium is a child medium, loading the parent medium identified by the retrieved ID information into another drive, reading a written first file part based on metadata saved, in the loaded, parent medium and, at about a same time, retrieving ID information about at least one child medium on which each file part is saved from the metadata stored to the parent medium, loading each of the at least one child medium associated with the retrieved ID information into one or more drives based on the ID information and reading file parts stored to the at least one child medium based on attribute information on the file parts, and ending the reading of the file when an end of the file is detected on one of the at least one child medium.

Figure 5:
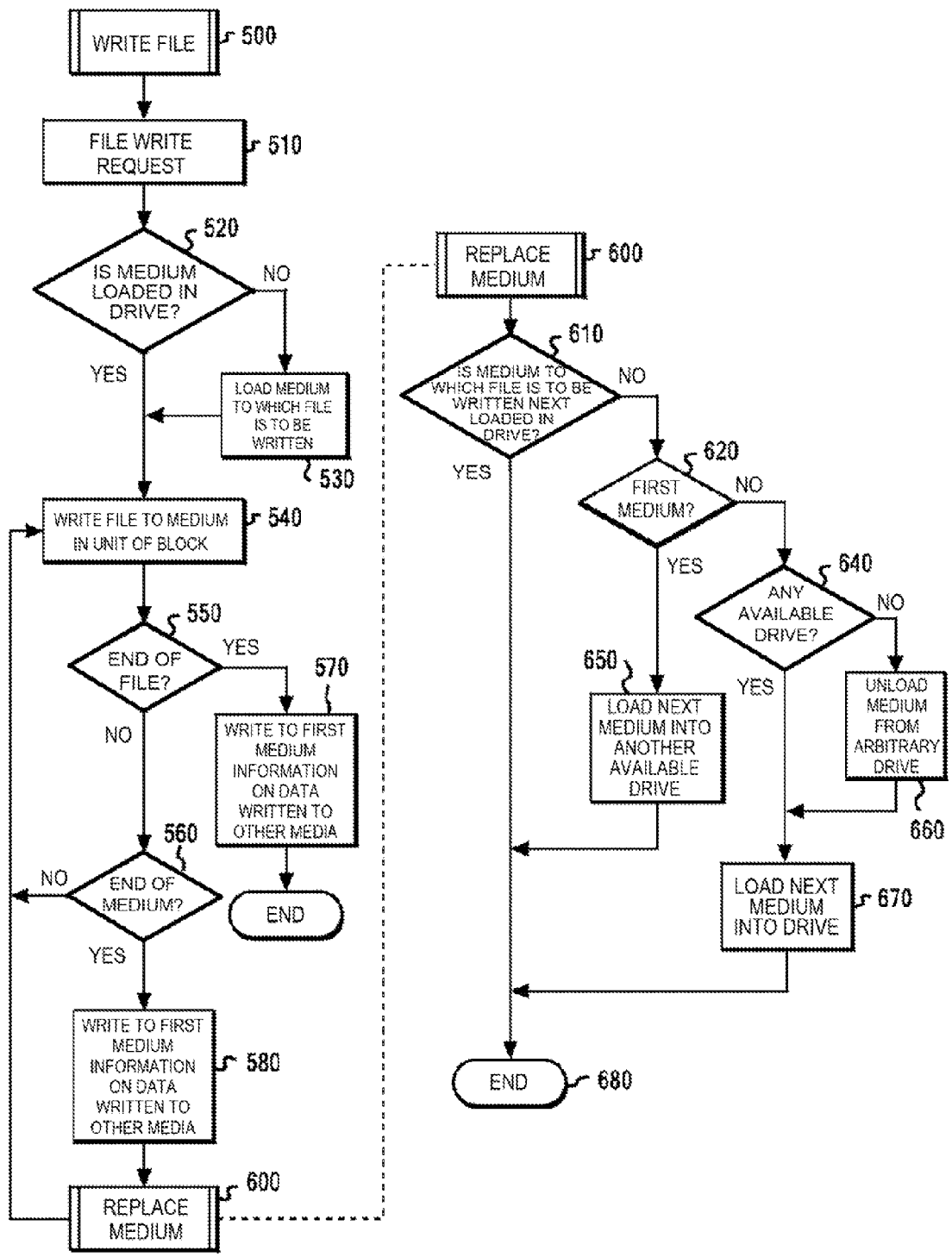
FIG. 5 shows a flowchart of a method for writing a file to a plurality of media, according to one embodiment.

FIG. 5 shows a flowchart of a process for writing a file to a plurality of media according to one embodiment. The read/write control module (such as the library manager) in the storage system performs the following steps. In writing, if any medium for which writing is completed is unloaded in advance, the time required to access the next medium may be reduced since the unloading does not occur during the access process.

In operation 510, a file write request is received.

In operation 520, it is determined whether a medium is already loaded in a drive. If a medium is already loaded in a drive (YES), the process proceeds to operation 540.

In operation 530, if a medium is not yet loaded in a drive, a medium is loaded into an available drive.

In operation 540, writing a file in units of blocks (128 KB, for example) is started on the medium in the drive. The drive writes the data (or a part of file) in a buffer to the medium once a data set of data is accumulated in the buffer. When the medium is the parent medium, the medium is kept loaded in the drive until the file is written to the end thereof in operation 550.

In operation 550, when the end of the file is reached in operation 540, the writing is ended. When all the file parts of one file are completely written to a plurality of child media, the ID information on all the media may saved in the parent medium in operation 570.

In operation 560, when the end of the medium is reached in operation 540, the medium is replaced with a new medium in operation 600, and the writing of the file parts in operation 540 is continuously performed on the new medium. Each time one file part of the file is completely written to a child medium, the ID information on the child medium may be saved in the parent medium in operation 580.

In operation 570, the ID information is saved on the child media to which the subsequent file parts are written in the parent medium. Each time one file part of the file is completely written to a child medium, the ID information on the child medium may be temporarily stored in a memory, and the ID information on all the child media may then be collectively saved in the parent medium.

In operation 580, the ID information is saved on the child media to which the subsequent file parts are written in the first medium (the parent medium). Each time one file part of the file is completely written to a child medium in operation 560, the ID information may be temporarily stored in a memory, and the ID information on the child medium may then be individually saved in the parent medium.

In operation 600, a new medium is loaded into a new drive. When the end of the medium is reached (YES in operation 560), a new child medium is loaded into a drive, and this procedure is repeated until the end of the file is reached (NO in operation 550). In medium replacement, an available drive may be prepared by unloading a child medium previously loaded. If the storage system has three or more drives, the subsequent child medium may be loaded into another available drive.

In operation 610, it is determined whether the next child medium is loaded in a drive.

In operation 620, when the child medium is not loaded (NO in operation 610) it is determined, whether the first medium (the parent medium) is loaded in the drive.

In operation 640, when the parent medium is not loaded (NO in operation 620), the presence of an available drive is determined.

In operation 650, when the parent medium is loaded (YES in operation 620), the subsequent child medium is loaded into another available drive to prepare for writing.

In operation 660, when there is no available drive (NO in operation 640), the medium in an arbitrary drive (a drive in use other than the drive loaded with the parent medium) is unloaded to provide an available drive.

In operation 670, when there is an available drive (YES in operation 640 or after operation 660), the subsequent child medium is loaded into the available drive to prepare for writing.

Figure 6:
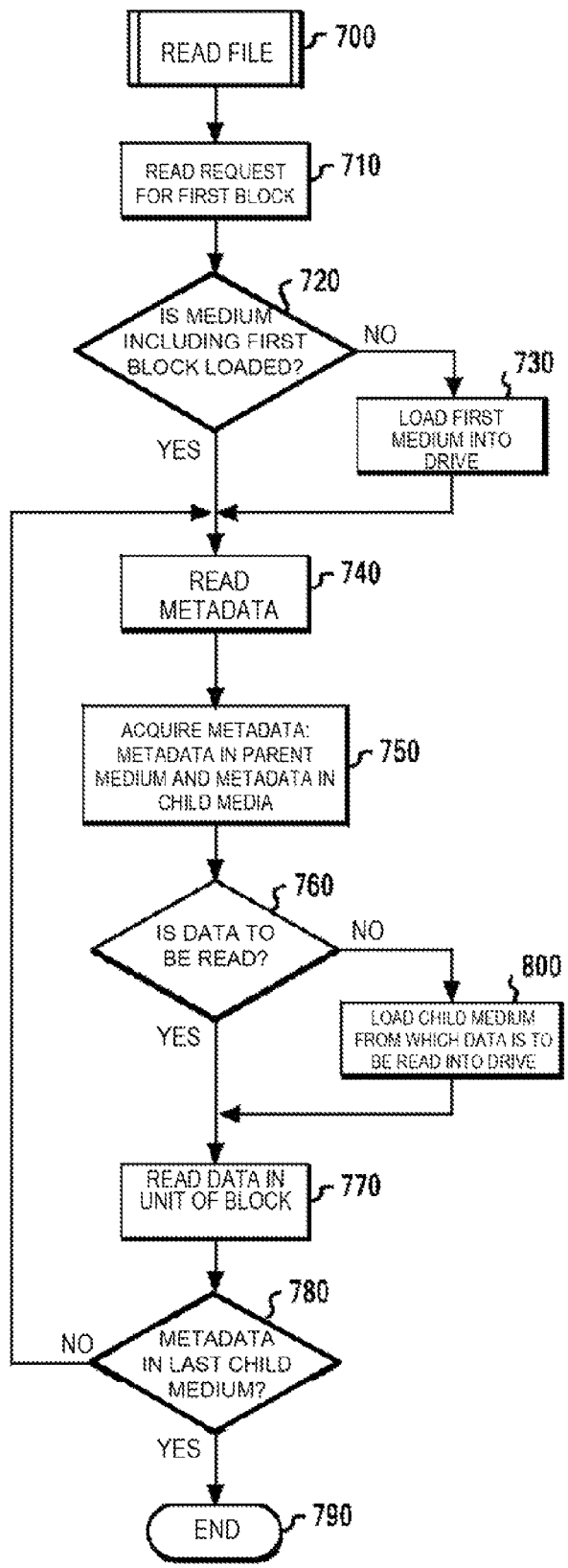
FIG. 6 shows a flowchart of a method for reading a file written to a plurality of media using the writing method, according, to one embodiment.

FIG. 6 shows a flowchart of a process for reading a file written to a plurality of media in the writing method according to one embodiment. The read/write control in the storage system performs the following steps. In reading, if any medium for which reading is completed is unloaded in advance, the time required to access the next medium may be reduced since the unloading does not occur during the access process.

In operation 710, a read request for the first block in a file is received.

In operation 720, it is determined whether the first medium (the parent medium) including the first block is already loaded in a drive. If a child medium is loaded, the ID information is acquired on the parent medium from the metadata (in the same manner as in operations 740 and 750 described below).

In operation 730 when the first medium (the parent medium) is not loaded in a drive yet (NO in operation 720), the parent medium is loaded into a drive based on the acquired ID information.

In operation 740, the metadata from the index partition in the medium (the parent medium or the child medium) is read.

In the case of the parent medium, read the first file part. In addition, in order to identify the child media that include the subsequent file parts, the metadata in the parent medium is saved in a memory or the like in the storage system. To load the child media that include the subsequent file parts, the parent medium may be unloaded from the drive to provide an available drive in one embodiment. The parent medium may be kept residing in the drive until the file parts in all the child media are completely read in another embodiment. If the parent medium resides in the drive, the parent medium does not have to be loaded again when the read file is edited.

In operation 750, the ID information on the media is acquired, the file and the attribute information on the file parts from the metadata.

The metadata in the parent medium includes the attribute information on the file (the file name and the size), the attribute information on the first file part (the part name, the data position in the medium and the size) and the attribute information on the file parts (the file part names, the ID information on the child media, the data positions in the media and the sizes).

The metadata in the child medium includes the ID information on the parent medium and the attribute information on the file part (the file part name, the data position in the medium and the size).

The data position in the medium may be specified by the block identification number and the offset of the block.

In operation 760, it is determined whether the data (the block identification number) read from the acquired metadata is saved in the loaded medium.

In operation 770, when the desired data is saved in the loaded medium (YES in operation 760), the desired data is read from the acquired child medium in unit of block. Alternatively, the ID information on the child medium to which the file part including the desired data may be retrieved from the acquired metadata from the parent medium (as in operations 740 and 750). Based on the ID information, the associated child medium is loaded in operation 800, and the desired data is read from the child medium in units of blocks of data.

In operation 780, it is determined whether the attribute information on the file part in the last child medium is completely read from the acquired metadata from the parent medium (as in operations 740 and 750).

In operation 800, the ID information is identified on the medium that includes the data (the block, identification number) read from the attribute information included in the metadata. The child medium associated with the ID information is loaded into a drive.

As can be seen from the above description, according to the reading method described herein in various embodiments, the time required for unloading and loading that occur in reading a file written as described above may be reduced, and the reading performance is improved. More specifically, in reading a file written in a plurality of media, the parent medium may be accessed in one pass based on the information stored in any child medium, so that the number of times that medium is unloaded and loaded may be reduced. Although the present invention has been described with regard to embodiments (practical examples), the scope of the present invention is not limited to the embodiments described above. It is obvious to those skilled in the art that various modifications may be made and various alternatives may be adopted without departing from the spirit and scope of the present invention.

What is claimed is:

1. A method for writing a file to a plurality of tape media in a storage system that comprises at least two tape drives, the plurality of tape media being identified as a parent tape medium and at least one child tape medium, the method comprising:
    loading the parent tape medium into a first tape drive to retrieve identification (ID) information about the parent tape medium from metadata stored thereon;
    writing a first file part of a file to the parent tape medium and, at a same time, saving a file name, attribute information about the file, and attribute information about the first file part to the parent tape medium as metadata;
    keeping the parent tape medium loaded in the first tape drive until all subsequent file parts of the file are completely written to the at least one child tape medium;
    loading a child tape medium into a second tape drive in order to write one or more subsequent file parts of the file and retrieving ID information about the child tape medium from metadata stored thereon;
    writing the one or more subsequent file parts to the child tape medium and, at a same time, saving the ID information and attribute information about the one or more subsequent file parts stored to the child tape medium as metadata to the parent tape medium;
    and additionally saving the ID information about the child tape medium and the attribute information about the one or more subsequent file parts stored to the child tape medium as metadata in the child tape medium.

2. The writing method according to claim 1, wherein the parent tape medium and the child tape medium are divided into two or more partitions in order to allow reading and writing by a file system for sequential access to the storage system, wherein the partitions include an index partition in which metadata of the file is saved and a data partition in which data of the file is saved, wherein the metadata in the parent tape medium is saved in the index partition of the parent tape medium, wherein the metadata in the child tape medium is saved in the index partition of the child tape medium, wherein the attribute information about the first file part included in the metadata in the parent tape medium includes a first file part name, a data position in the parent tape medium, and a size, and wherein the attribute information about the one or more subsequent file parts included in the metadata in the child tape medium includes one or more subsequent file part names, a data position in the tape medium for each of the one or more subsequent file parts, and a size of each of the one or more subsequent files.

3. The writing method according to claim 2, wherein the ID information on the child tape medium is associated with the attribute information about the one or more subsequent file parts written to the child tape medium and is additionally saved as metadata in the parent tape medium.

4. The writing method according to claim 2, wherein ID information for each of the at least one child tape medium is saved as metadata in the parent tape medium such that an order in which subsequent file parts are written to the at least one child tape medium is identifiable.

5. A plurality of tape media to which a file is written in the writing method according to claim 2.

6. The writing method according to claim 1, wherein the ID information on the child tape medium is associated with the attribute information about the one or more subsequent file parts written to the child tape medium and is additionally saved as metadata in the parent tape medium.

7. The writing method according to claim 1, wherein ID information for each of the at least one child tape medium is saved as metadata in the parent tape medium such that an order in which subsequent file parts are written to the at least one child tape medium is identifiable.

8. A plurality of tape media to which a file is written in the writing method according to claim 1.

9. The writing method according to claim 1, further comprising: loading an additional child tape medium into a tape drive other than the first tape drive in order to write one or more remaining subsequent file parts that have not yet been written and retrieving ID information about the additional child tape medium from metadata stored thereon;
   writing the one or more remaining subsequent file parts to the additional child tape medium and, at a same time, saving the ID information and attribute information about the one or more remaining subsequent file parts in the additional child tape medium as metadata on the parent tape medium;
   and additionally saving the ID information about the additional child tape medium and the attribute information about the one or more remaining subsequent file parts as the metadata in the additional child tape medium.

10. The writing method according to claim 9, wherein additional child tape media are loaded and subsequent file parts are written to the additional child tape media until a last file part of the file is written to the additional child tape media.

11. A method for reading a file written to a plurality of tape media according to claim 8, the method comprising:
   loading one of the plurality of tape media in which a part of the file are saved into a tape drive;
   reading metadata from the loaded tape medium and determining from the metadata whether the tape medium is a parent tape medium or a child tape medium for the file;
   retrieving ID information on the parent tape medium from the metadata saved in the child tape medium when the loaded tape medium is a child tape medium;
   loading the parent tape medium identified by the retrieved ID information into another tape drive;
   reading a written first file part based on metadata saved in the loaded parent tape medium and, at a same time, retrieving ID information about at least one child tape medium on which each file part is saved from the metadata stored to the parent tape medium;
   loading each of the at least one child tape medium associated with the retrieved ID information into one or more tape drives based on the ID information and reading file parts stored to the at least one child tape medium based on attribute information on the file parts;
   and ending the reading of the file when an end of the file is detected on one of the at least one child tape medium.

12. The reading method according to claim 11, wherein when it is determined that the loaded tape medium is a parent tape medium, retrieving ID information on the parent tape medium and loading the parent tape medium is skipped.

13. A storage system configured for writing a file to a plurality of tape media, with the plurality of tape media being identified as a parent tape medium and at least one child tape medium, the storage system comprising at least two tape drives and a read/write control configured for:
   loading the parent tape medium into a first tape drive to retrieve identification (ID) information about the parent tape medium from metadata stored thereon;
   writing a first file part of a file to the parent tape medium and, at a same time, saving a file name, attribute information about the file, and attribute information about the first file part to the parent tape medium as metadata;
   keeping the parent tape medium loaded in the first tape drive until all subsequent file parts of the file are completely written to the at least one child tape medium;
   loading a child tape medium into a second tape drive in order to write one or more subsequent file parts of the file and retrieving ID information about the child tape medium from metadata stored thereon;
   writing the one or more subsequent file parts to the child tape medium and, at a same time, saving the ID information and attribute information about the one or more subsequent file parts stored to the child tape medium as metadata to the parent tape medium;
   and additionally saving the ID information about the child tape medium and the attribute information about the one or more subsequent file parts stored to the child tape medium as metadata in the child tape medium.

14. The storage system according to claim 13, wherein the parent tape medium and the child tape medium are divided into two or more partitions in order to allow reading and writing by a file system for sequential access to the storage system, wherein the partitions include an index partition in which metadata of the file is saved and a data partition in which data of the file is saved, wherein the metadata in the parent tape medium is saved in the index partition of the parent tape medium, wherein the metadata in the child tape medium is saved in the index partition of the child tape medium, wherein the attribute information about the first file part included in the metadata in the parent tape medium includes a first file part name, a data position in the parent tape medium, and a size, and wherein the attribute information about the one or more subsequent file parts included in the metadata in the child tape medium includes one or more subsequent file part names, a data position in the tape medium for each of the one or more subsequent file parts, and a size of each of the one or more subsequent files.

15. The storage system according to claim 14, wherein the ID information on the child tape medium is associated with the attribute information about the one or more subsequent file parts written to the child tape medium and is additionally saved as metadata in the parent tape medium.

16. The storage system according to claim 14, wherein ID information for each of the at least one child tape medium is saved as metadata in the parent tape medium such that an order in which subsequent file parts are written to the at least one child tape medium is identifiable.

17. A storage system configured to read a file written to a plurality of tape media according to claim 13, the storage system comprising a read/write control configured for:

loading an additional child tape medium into a tape drive other than the first tape drive in order to write one or more remaining subsequent file parts that have not yet been written and retrieving ID information about the additional child tape medium from metadata stored thereon;

writing the one or more remaining subsequent file parts to the additional child tape medium and, at a same time, saving the ID information and attribute information about the one or more remaining subsequent file parts in the additional child tape medium as metadata on the parent tape medium;

and additionally saving the ID information about the additional child tape medium and the attribute information about the one or more remaining subsequent file parts as the metadata in the additional child tape medium.

18. The storage system according to claim 17, wherein additional child tape media are loaded and subsequent file parts are written to the additional child tape media until a last file part of the file is written to the additional child tape media.

* * * * *